(12) United States Patent
Dross et al.

(10) Patent No.: US 11,333,869 B2
(45) Date of Patent: May 17, 2022

(54) LED LIGHTING DEVICE HAVING OPPOSED IRREGULAR LENSLET ARRAYS WITH PLANAR FACETS

(71) Applicant: SIGNIFY HOLDING B.V., Eindhoven (NL)

(72) Inventors: Oliver Dross, Waalre (NL); Michel Cornelis Josephus Marie Vissenberg, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 360 days.

(21) Appl. No.: 16/342,059

(22) PCT Filed: Nov. 2, 2017

(86) PCT No.: PCT/EP2017/078065
§ 371 (c)(1),
(2) Date: Apr. 15, 2019

(87) PCT Pub. No.: WO2018/086980
PCT Pub. Date: May 17, 2018

(65) Prior Publication Data
US 2021/0278646 A1    Sep. 9, 2021

(30) Foreign Application Priority Data
Nov. 14, 2016   (EP) .................... 16198564

(51) Int. Cl.
*F21V 5/04*    (2006.01)
*G02B 19/00*   (2006.01)
(Continued)

(52) U.S. Cl.
CPC ............ *G02B 19/0061* (2013.01); *F21V 5/04* (2013.01); *G02B 3/0068* (2013.01); *G02B 19/0028* (2013.01); *F21Y 2115/10* (2016.08)

(58) Field of Classification Search
CPC . F21V 5/006; F21V 5/04; F21V 5/002; G02B 3/0068; G02B 3/0006;
(Continued)

(56) References Cited

U.S. PATENT DOCUMENTS 4,952,026 A * 8/1990 Bellman .......... B29D 11/00278
257/E31.127
5,594,526 A * 1/1997 Mori .................... G02B 3/0056
355/67
(Continued)

FOREIGN PATENT DOCUMENTS

JP       2007123175 A    5/2007
WO         0171410 A2    9/2001
(Continued)

OTHER PUBLICATIONS

Oliver Dross, "Kohler Integration in Color Mixing Collimators", Philips Research, Proc. of SPIE, vol. 9571, 957109-1 to 957109-17.
(Continued)

*Primary Examiner* — Ismael Negron
(74) *Attorney, Agent, or Firm* — Daniel J. Piotrowski

(57) ABSTRACT

A lighting device includes at least on LED light source, ca collimator, a first lenslet array of lenslets tessellated in an irregular pattern, and a second array of lenslets tessellated in the same irregular pattern as the first array of lenslets, such that each of the lenslets in the first array is aligned with a corresponding one of the lenslets in the second array. The first array further includes a plurality of transmissive planar facets covering an intersection between lenslet.

15 Claims, 8 Drawing Sheets

(51) Int. Cl.
*G02B 3/00* (2006.01)
*F21Y 115/10* (2016.01)

(58) Field of Classification Search
CPC ... G02B 3/0043; G02B 5/005; F21Y 2113/13; F21Y 2115/10
See application file for complete search history.

(56) References Cited

U.S. PATENT DOCUMENTS

| | | | | |
|---|---|---|---|---|
| 5,636,056 | A * | 6/1997 | Itonaga | F21S 48/2212 |
| | | | | 359/601 |
| 6,402,347 | B1 * | 6/2002 | Maas | F21V 5/04 |
| | | | | 362/294 |
| 7,186,004 | B2 * | 3/2007 | Powell | G02B 3/0025 |
| | | | | 359/365 |
| 8,416,498 | B2 * | 4/2013 | Sakaki | B29C 33/3878 |
| | | | | 359/619 |
| 8,444,295 | B2 * | 5/2013 | Young | F21V 5/008 |
| | | | | 362/235 |
| 8,638,027 | B2 * | 1/2014 | Van Dijk | F21V 29/87 |
| | | | | 313/46 |
| 9,945,988 | B2 * | 4/2018 | Powell | G02B 27/0075 |
| 10,520,162 | B2 * | 12/2019 | Nakamura | F21S 41/143 |
| 10,989,388 | B2 * | 4/2021 | Boonekamp | B29C 64/118 |
| 2006/0072125 | A1 * | 4/2006 | Shimizu | B29D 11/0073 |
| | | | | 356/630 |
| 2007/0159700 | A1 * | 7/2007 | Danner | G02B 27/0075 |
| | | | | 359/626 |
| 2014/0016181 | A1 | 1/2014 | Dal Negro | |

FOREIGN PATENT DOCUMENTS

| | | |
|---|---|---|
| WO | 2016050710 A1 | 4/2016 |
| WO | 2016116290 A1 | 7/2016 |

OTHER PUBLICATIONS

Oliver Dross et al., "Illumination Optics: Kohler integration optics improve illumination homogeneity", Media for Laser Focus World, p. 1-3.

J. Muschaweck, "Randomized Micro Lens Array for Colour Mixing", Proc. SPIE, vol. 7954, 79540A-9, 2011.

* cited by examiner

50

LED LIGHTING DEVICE HAVING OPPOSED IRREGULAR LENSLET ARRAYS WITH PLANAR FACETS

CROSS-REFERENCE TO PRIOR APPLICATIONS

This application is the U.S. National Phase application under 35 U.S.C. § 371 of International Application No. PCT/EP2017/078065, filed on Nov. 2, 2017, which claims the benefit of European Patent Application No. 16198564.3, filed on Nov. 14, 2016. These applications are hereby incorporated by reference herein.

FIELD OF THE INVENTION

The present invention relates to an integrating lenslet arrangement including a first lenslet array of lenslets tessellated in an irregular pattern; and a second lenslet array of further lenslets tessellated in said irregular pattern, each further lenslet being aligned with one of said lenslets.

The present invention further relates to an optical arrangement including such a lenslet arrangement.

The present invention further relates to a lighting device comprising such an optical arrangement.

The present invention further relates to a luminaire including such a lighting device.

BACKGROUND OF THE INVENTION

There is a growing interest in new optical devices having an improved efficiency in terms of energy consumption, colour mixing and illumination uniformity. Collimators are known to be used in many illumination applications to produce a desired illumination pattern beam angle. However, many collimators tend to reproduce at least part of the spatial structure of the light source. Non-uniform light sources such that e.g. light emitting diode (LED) arrays and LEDs of different colours may hence cause artefacts visible in the resulting light beam and beam spot when combined with a collimator. Moreover, almost all collimators produce a bell-shaped beam pattern with a more or less smooth decay. This is undesirable in applications where an approximately constant intensity with a relative hard cut-off is preferred.

Existing optical devices may therefore comprise mixing means, such as a lenslet arrangement, which is added to the collimator so as to further mix the light and to reduce artefacts caused by the light source. Such lenslets are small lenses, sometimes also called microlenses, which shape part of the collimated luminous output produced by the collimator. A common lenslet arrangement comprises opposing arrays of lenslets in which lenslets of opposing arrays are pairwise optically aligned. Such arrangements are commonly referred to as Köhler integrators. A first lenslet of the array facing the collimator typically focuses its incident light on the paired lenslet of the opposing array, which paired lenslet creates an image of the illuminance pattern on the first lenslet in the far field, i.e. at a distance several orders of magnitude larger than the dimensions of the lenslets. For example, in a typical optical application, the image is created at distances in the order of at least 1 meter away from the lenslet arrangement, which is a typical distance range for generating beam profiles (spots) with a lighting device such as a light bulb.

However, it is not straightforward to create such an image in the far field that is relatively free of artefacts. In particular, when trying to generate a round beam profile, this may be attempted with circular lenslets, but circular lenslets cannot form a tessellated lenslet array and the spaces between the circular lenslets in the array, e.g. an array in which the circular lenslets are arranged in a hexagonal arrangement, cause artefacts in the far field image. Such artefacts may be suppressed by covering these spaces with an opaque (masking) material, but this requires a complex additional processing step, which increases the manufacturing cost and complexity of the lenslet arrangement. Instead of circular lenslets, polygonal lenslets may be deployed that can form a tessellated lenslet array, but such tessellations cannot form a round beam.

A round beam can be provided by arranging lenslets on rings, e.g. by regularized random placements as suggested by J. Muschaweck, "Randomized Micro Lens Array for Colour Mixing" in Proc. SPIE, Vol. 7954, 79540A-9, 2011. Such tessellations provide average round patterns but with poorly defined pattern edge gradients because many images of protruding polygon corners extend beyond the spherical beam target shape. In lighting optics, in spite of the large number, e.g. several hundreds or thousands, of lenslets in each array, such protruding corners become clearly visible as a sharply defined corner or as a colour-separated protrusion (in case of colour mixing), which is undesirable.

Hence, there exists a need for an optical module including a lenslet arrangement capable of creating a beam, e.g. a round beam, having an artefact free but relatively sharp edge profile.

SUMMARY OF THE INVENTION

The present invention seeks to provide a lenslet arrangement capable of creating a beam, e.g. a round beam, having an artefact free sharp edge profile.

The present invention further seeks to provide an optical arrangement including such a lenslet arrangement.

The present invention further seeks to provide a lighting device comprising such an optical arrangement.

The present invention further seeks to provide a luminaire including such a lighting device.

According to an aspect, there is provided an integrating lenslet arrangement including a first lenslet array of lenslets in an irregular pattern; and downstream of the first lenslet array a second lenslet array of further lenslets in said irregular pattern, each further lenslet being aligned with one of said lenslets; wherein the first lenslet array comprises adjacent lenslets that have a shared wall shaped intersection and wherein the first lenslet arrays further comprises a plurality of transmissive planar facets covering pockets in between the lenslets. Typically the shared wall intersection is visible at the surface of the (first) lenslet array as a shared edge of adjacent lenslets.

Allowing adjacent lenslets to have a shared wall shaped intersection results in the lenslets being non-circular and enables a closer packing of the lenslets and hence smaller pockets (or spaces) between the lenslets that cause artefacts in the beam. Said wall shaped intersections extend in the downstream direction from the first lenslet array towards the second lenslets array, preferably transverse to planar facets of the first lenslet array, which typically is parallel to the direction of a collimated light beam impinging on the first lenslet array. Because of this preferred orientation of the wall shaped intersections, their contribution to causing artefacts in the transmitted beam is relatively low. Typically it is obtainable thereby that the space between the irregular arranged lenslets covered by the plurality of transmissive planar facets is less than 20%, which is advantageous as obtrusive, disturbing aberrations in the beam are effectively counteracted. A too high percentage of space between the lenslets, i.e. more than 20%, of the area being covered by planar facets would lead to the contribution of the planar facets to the beam to become too prominent and would lead to obtrusive, disturbing aberrations. Preferably, the area covered by the plurality of planar facets is between 5% to 9%, for example 8%, of a total surface of the first lenslet array in order to ensure on the one hand that the main beam has a well-defined shape, for example a round beam, surrounded by a subtle halo, but on the other hand that the beam remains sufficiently well-defined, i.e. with only minor, unobtrusive optical aberrations. The percentage of space formed by the pockets of a densest packing of equally sized circular lenslets regular patterns is about 10%, however, such a densest regular packing of equally sized circular lenslets is undesired as these cannot form a round beam, but will form a beam having a cross section of a regular hexagon. Typically, in known irregular circular lenslet arrangements the percentage of space is over 20%.

The terms "upstream" and "downstream" relate to an arrangement of items or features relative to the propagation of the light from a light generating means (here especially the light source), wherein relative to a first position within a beam of light from the light generating means, a second position in the beam of light closer to the light generating means is "upstream", and a third position within the beam of light further away from the light generating means is "downstream".

It has been found that the combination of irregularly (tessellated) lenslet arrays in which individual lenslets are aligned (paired) with a corresponding lenslet in the opposing array with planar (flat) facets at the pockets between lenslets in at least one of the lenslet arrays causes, upon imaging a collimated light source, a uniform halo effect around the imaged main beam, especially when the number of lenslets in the array is high, e.g. at least 100. Such a halo effect is considered aesthetically acceptable in many application domains including LED lighting. This is because such planar facets 'truncate' the lenslet area as part of the base of the lenslet is covered by a planar facet, which eliminates (or at least reduces) edge artefacts caused by these pockets and causes the generation of an amount of uncontrolled light. Another way to describe the lenslets arrangement with facets is that in between at least three adjacent, mutually touching lenslets relatively deep pockets are formed, the bottom of these pockets being said planar facets via which the sharp ends of the bottoms are truncated thus reducing the undesired artefacts caused by deep pockets, but generating the uncontrolled light. This uncontrolled light generates a background light level around the main beam, which due to the irregular nature of the tessellation pattern, combines into the uniform halo. The second lenslet array creates images of the convex portions of the lenslets of the first lenslet array, thereby improving the definition of the main beam, in particular when the first lenslet array faces the collimated light source.

In the context of the present application, an irregular pattern is a pattern having no symmetry. Such patterns may include patterns including symmetrical domains, which domains combine to form an asymmetrical pattern. An example of such a latter pattern is a phyllotaxis pattern.

As will be understood from the foregoing, the truncation of the lenslets by light-transmissive planar facets at the pockets between lenslets strictly speaking disrupts a tessellation of the lenslets, as neighboring lenslets are now separated by planar facets, thereby yielding an integrating lenslet arrangement including a first lenslet array of lenslets in an irregular pattern and a second lenslet array of further lenslets in the same irregular pattern, with each further lenslet being aligned with one of the lenslets, with the first lenslet array further comprising a plurality of transmissive planar facets in between the lenslets, e.g. filling an intersection between neighboring lenslets. However, such an integrating lenslet arrangement can be distinguished from non-tessellated lenslet arrangements in that an angle between the tangent of a lenslet and an adjacent facet at the point of contact between the lenslet and its adjacent facet is typically larger than 90° due to the truncation of the lenslet compared to non-tessellated lenslet arrangements in the angle between this tangent at the point of contact of the lenslet with the substrate from which the lenslet extends typically is about 90°.

Moreover, in some embodiments, the tessellation of the lenslets can still be recognized from the fact that only some of the pockets of the tessellation pattern are covered by such planar facets, where the total number of planar facets, e.g. the percentage of intersections covered, may be chosen to ensure a uniform halo is formed around the beam profile generated with the lenslet arrangement. This total number may be chosen as a minimum number of planar facets required to achieve the desired uniform halo.

Preferably, the planar facets lie in the same virtual plane in order to maximize the uniformity of the halo effect. By defining the height of the virtual plane, i.e. the amount of facet material over the facet intersections, the amount of cut-off lenslet surface area can be controlled, e.g. to control the intensity of the halo.

The first lenslet array and the second lenslet array may be formed on a circular substrate although other substrate shapes, i.e. non-circular substrates, e.g. to form circular beam profiles, may be contemplated.

The first lenslet array and the second lenslet array define opposing surfaces of a single body, which yields a particular cost-effective embodiment of such a lenslet arrangement, as it may be manufactured in a straightforward manner, e.g. by molding. Alternatively, the first lenslet array and the second lenslet array may be formed on spatially separated bodies, e.g. bodies separated by an air gap, which may be beneficial for tuning the optical properties of the lenslet arrangement in some applications.

The transmissive planar facets preferably are transparent although in alternative embodiments the transmissive planar facets may be (somewhat) translucent.

In an embodiment, the second lenslet array further comprises a plurality of further transmissive planar facets, each further facet covering a further pocket. This for example may be desirable from a manufacturing perspective, e.g. to create mirror-imaged lenslet arrays such that either lenslet array may face the collimated light source.

The lenslets and further lenslets may have locally varying sizes, e.g. to suppress etendue dilution by the lenslet arrangement. The integrating lenslet arrangement may have the feature that only a percentage of pockets between the lenslets is covered by planar facets, said percentage being in the range of 60% to 95%, preferably 70% to 90%, such as 80% to 85%. By leaving out the planar facets in a specific pattern, the lenslet arrangement can be provided with a kind of watermarking, yet without leading to a significant distortion of the beam.

According to another aspect, there is provided an optical arrangement comprising a collimator and the integrating lenslet arrangement of any of herein described embodiments. Such an optical arrangement is capable of creating light beams, e.g. in the far field, without beam edge artefacts due to the elimination of the beam edge artefacts by the planar facets over the pockets causing such artefacts and the generation of a uniform halo around the beam edge. In embodiments where in particular only the first lenslet array comprises the planar facets, and the second lenslet array is essentially free from transmissive, planar facets, preferably the first lenslet array faces the collimator to ensure the generation of a sharp light beam.

At least the first lenslet array may be integral to the collimator, e.g. to limit the total number of components in the optical arrangement and/or to reduce manufacturing cost.

According to yet another aspect, there is provided a lighting device comprising the optical arrangement of any of the herein described embodiments and at least one LED light source positioned relative to the collimator such that the collimator collimates the light of the at least one LED light source and projects said collimated light onto the lenslet arrangement. Such a lighting device, e.g. a spot light, exhibits improved beam forming capability in the far field, e.g. improved color uniformity and reduced visibility of edge artefacts due to the presence of the lenslet arrangement in its optical arrangement.

According to yet another aspect, there is provided a luminaire comprising such a lighting device. Such a luminaire may for instance be a holder of the lighting device or an apparatus into which the lighting device is integrated.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
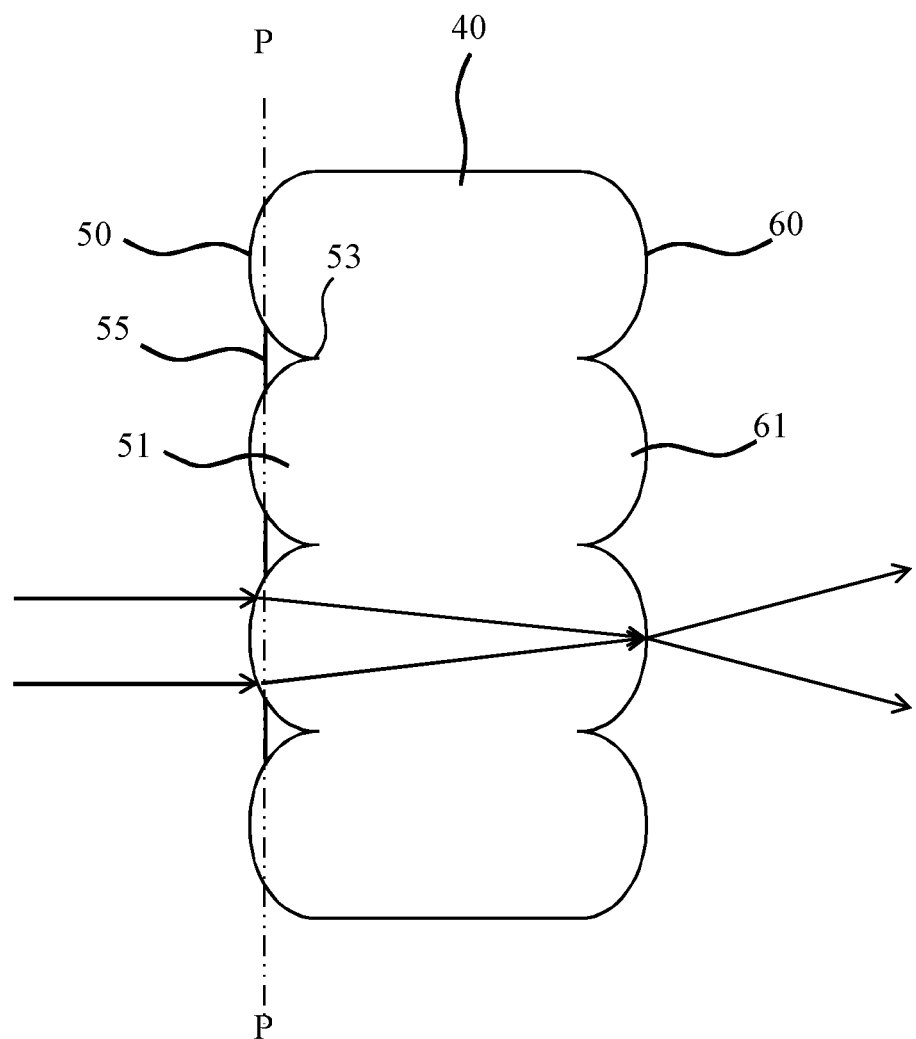
FIG. 1 schematically depicts a cross-sectional view of a lenslet arrangement according to an embodiment.

It should be understood that the Figures are merely schematic and are not drawn to scale. It should also be understood that the same reference numerals are used throughout the Figures to indicate the same or similar parts.

FIG. 1 schematically depicts a lenslet arrangement 40 according to an embodiment of the present invention. The lenslet arrangement 40 comprises a first lenslet array 50 and a second lenslet array 60. The first lenslet array 50 comprises a tessellated pattern of first lenslets 51 and the second lenslet array 60 comprises a tessellated pattern of second lenslets 61. The first lenslets 51 and the second lenslets 61 face away from each other in opposite directions, e.g. along the optical axis of the lenslet arrangement 40. In FIG. 1, the lenslet arrangement 40 is made as a single body comprising the first lenslet array 50 and the second lenslet array 60 on opposite surfaces of the single body, e.g. an integrating lenslet plate. This has the advantage that the number of surface interfaces between the first lenslet array 50 and the second lenslet array 60 is minimized, which reduces the risk of optical artefacts introduced by such surface interfaces into the light beam to be formed with the lenslet arrangement 40. The single body may be made of any suitable material, e.g. glass or an optical grade polymer material such as polycarbonate, PMMA or PET. The use of such optical grade polymers has the advantage that the lenslet arrangement 40 may be formed in a cost-effective manner, e.g. by moulding.

The first and second lenslet arrays 50, 60 are tessellated such that the tessellation of the first lenslet array 50 coincides in terms of pattern and lenslet shape with the tessellation of the second lenslet array 60, and such that the tessellation pattern of the first lenslet array 50 is aligned with the tessellation pattern of the second lenslet array 60, i.e. the first lenslet array 50 and the second lenslet array 60 are arranged such that a tessellation of the first lenslet array 50 coincides in terms of pattern and lenslet size with a tessellation of the second lenslet array 60 such that for example each lenslet 51 is optically aligned with a further lenslet 61 having the same shape as the lenslet 51, i.e. the lenslet 51 and the further lenslet 61 share an optical axis.

In an embodiment, each lenslet 51 is arranged in an imaging plane of a corresponding further lenslet 61 and vice versa, thereby providing a non-imaging lenslet arrangement 40 that may act as an integrator such as a Kohler integrator. Each lenslet 51 is typically arranged such that all collimated light from the one or more light sources 10 incident on the lenslet 51 is projected onto the corresponding further lenslet 61 such as to avoid crosstalk between the respective lenslets of the first lenslet array 50 and the second lenslet array 60. In this manner, the lenslet arrangement 40 may create luminous profile in the far field or a plane to illuminate that is composed by the superposition of the image portions generated by the respective lenslet pairs in the far field. The lenslets 51 may focus the incident collimated light onto the (outer surface of) corresponding further lenslets 61, which further lenslets 61 projects the light distribution on the entry surface on lenslet 51 onto the target surface. In this manner, the lenslet arrangement 40 may create a luminous profile corresponding to the combined shape of the individual lenslets onto a surface in the far field, e.g. a floor, wall or the like. The lenslets 51, 61 may be spherical or aspherical lenslets, and may have a radius based on the index of refraction and the thickness of the lenslet arrangement 40, as will be readily understood by the skilled person. The further lenslets 61 of the second lenslet array 60 may be imaging lenslets in at least some embodiments, which imaging lenslets replicate the irradiance distribution at the entry surface of the corresponding lenslets 51 of the first lenslet array 50.

The tessellation pattern of the first and second lenslet arrays 50, 60 is an irregular pattern in which different (polygonal) lenslets within the same array typically have different shapes. As is known from for example O. Dross, "Kohler Integration in Color Mixing Collimators", Proc. Of SPIE, Vol. 9571, 957109-1 (2015), 17 pp, such irregular tessellation patterns are particularly suitable for forming circular beam profiles exhibiting good colour mixing although edge artefacts may be difficult to avoid as previously explained. If such an integrating lenslet arrangement 40 is used in combination with a collimator providing image rotation, such as a photon funnel, TIR Fresnel lens, a parabolic reflector or the like, the pinhole images at different portions of the integrating arrangement vary in sagittal and meridional size and orientation. This may be compensated by sizing the respective lenslets 51, 61 such that these lenslets have locally varying sizes, as is explained in further detail in WO 2016/116290 A1.

The substrates of the lenslet arrangement 40 in the form of the first lenslet array 50 and the second lenslet array 60 may have any suitable shape, e.g. a circular or disk shape. Other substrate shapes for the lenslet arrangement 40 may be contemplated. As will be understood by the skilled person, the lenslets 51, 61 in the lenslet arrays actually illuminated by the collimator 20 determine how the lenslet arrangement 40 acts upon the collimated light, i.e. what beam shape is generated, such that the illuminated area may have a different shape than the substrate of a lenslet array. For example, as is well-known per se, some tessellations can form circular beam profiles even when arranged on a non-circular substrate.

As is well-known per se, the combination of collimated light generated by an embodiment of the aforementioned light source arrangement with such a lenslet arrangement 40, e.g. an integrating lenslet array, may yield a luminous output having with excellent homogeneity in terms of intensity distribution as well as sharp cut-offs, which is therefore particularly suitable for the generation of a luminous output having a defined shape, e.g. a light spot of a defined shape, but the irregular lenslet placements suffer from polygonal artefacts at the edges of the array. Such artefacts are more pronounced for tessellations of a more arbitrary nature. Such artefacts result from the overall light distribution generated by the lenslet arrangement 40 being a superposition of the sharp images of the outline of the lenslets 51. Consequently, due to these polygonal artefacts at the boundary of the luminous profile generated by the lenslet arrangement 40, it is far from trivial to generate luminous distributions having a continuous boundary, such as circular or elliptical luminous profiles.

This problem is addressed in FIG. 1 by the first lenslet array 50 further comprising a plurality of light-transmissive planar facets 55 arranged at the pockets 53 between the lenslets 51. Each pocket 53 may be covered by such a planar facet although in alternative embodiments only some of the pockets 53 are fully or partly covered by a planar facet 55. The light-transmissive planar facets 55 preferably are transparent (although in alternative embodiments the light-transmissive planar facets 55 may have a degree of translucency) and preferably are arranged in a single virtual plane P. As will be understood by the skilled person, this single virtual plane is composed of cross-sectional portions of the lenslets 51 and the light-transmissive planar facets 55. The area ratio between the lenslets 51 and the light-transmissive planar facets 55 in this virtual plane may be controlled by the height at which the virtual plane is positioned over the pockets 53. In other words, this ratio may be controlled by the degree of truncation of the lenslets 51 by the light-transmissive planar facets 55.

Figure 2:
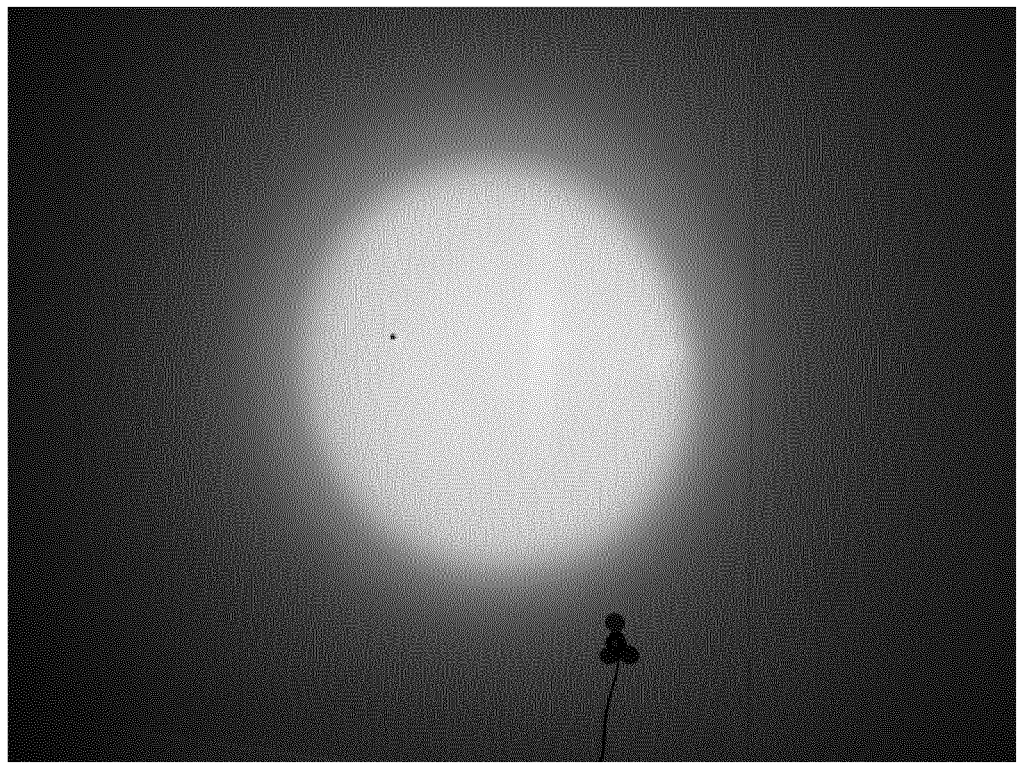
FIG. 2 is an image of a light beam produced with a lighting device according to an embodiment.

The light-transmissive planar facets 55 blur the sharp wall edges between the tessellated lenslets 51, thereby blurring the artefacts around the beam edge generated by the lenslet arrangement 40, e.g. a circular beam. This can be understood as follows. The light-transmissive planar facets 55 truncate the part of the microlens that would produce an image protruding from the edge of the intensity pattern, and generate an amount of uncontrolled light that creates a background light level around the main beam as formed with the lenslet arrangement 40. It has been found that for typical integrating lenslet arrays having a large number of lenslets tessellated in an irregular pattern, this background light level causes the formation of a uniform halo around the main beam profile. This is shown in FIG. 2, in which a LED light source is imaged with a collimator and a lenslet arrangement according to an embodiment of the present invention, in which the lenslets 51, 61 are arranged in a phyllotaxis pattern.

In addition, the truncation of the polygonal lenslets 51 causes these lenslets to have a more rounded shape as imaged by a corresponding further lenslet 61, which increases the sharpness of the light distribution within the main beam profile and reduces beam edge artefacts caused by the sharp wall edges between polygonal lenslets 51. As will be understood from the foregoing, increasing the part of the virtual plane covered by the light-transmissive planar facets 55 can increase the sharpness of the main beam profile at the expense of a brighter halo around the main beam. In order to achieve an optically acceptable beam profile, the total area of the virtual plane covered by the light-transmissive planar facets preferably is lower than 20%, preferably in the range of 5% to 9%.

Figure 3:
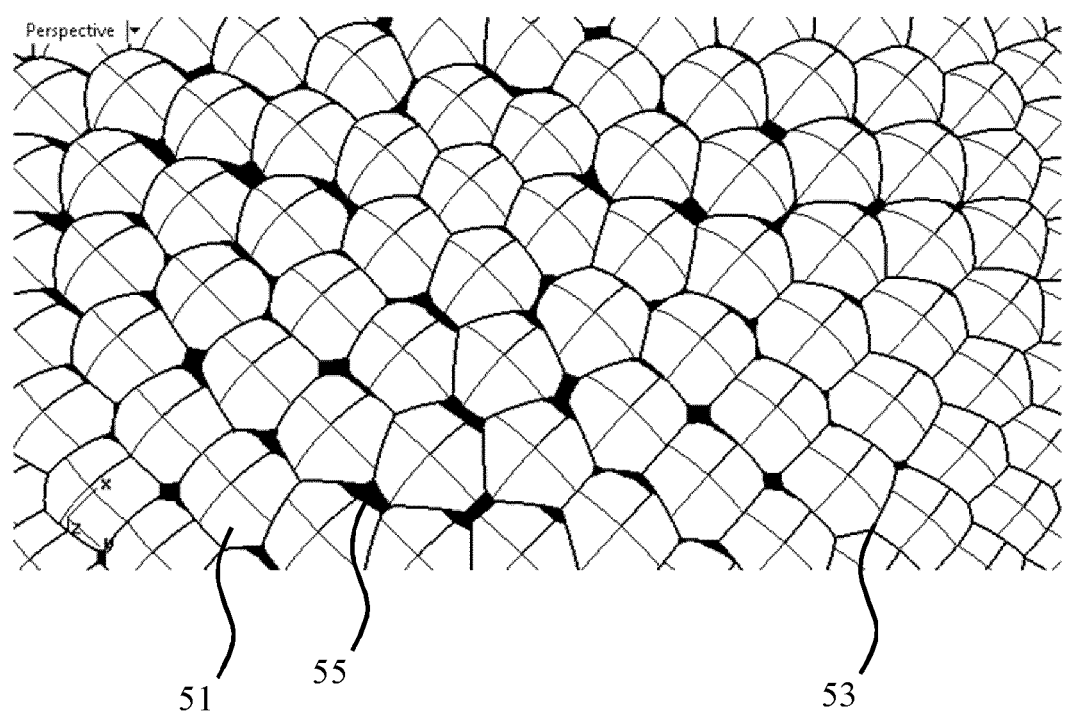
FIG. 3 schematically depicts a perspective view of an aspect of a lenslet arrangement according to an embodiment.

FIG. 3 is a perspective view of a first lenslet array 50 according to an example embodiment. As can be seen, the polygonal lenslets 51 are arranged in an irregularly tessellated pattern with light-transmissive planar facets 55 positions at the pockets 53 between the lenslets 51. It should be understood that facets 55 are shown in black for the sake of clarity only; this is not to be interpreted as these facets being opaque. It is further shown in FIG. 3 that adjacent lenslets 51 share common wall shaped intersections 52 which are shown as a shared edge shape intersections, enabling a closer packing of the lenslets.

Figure 4:
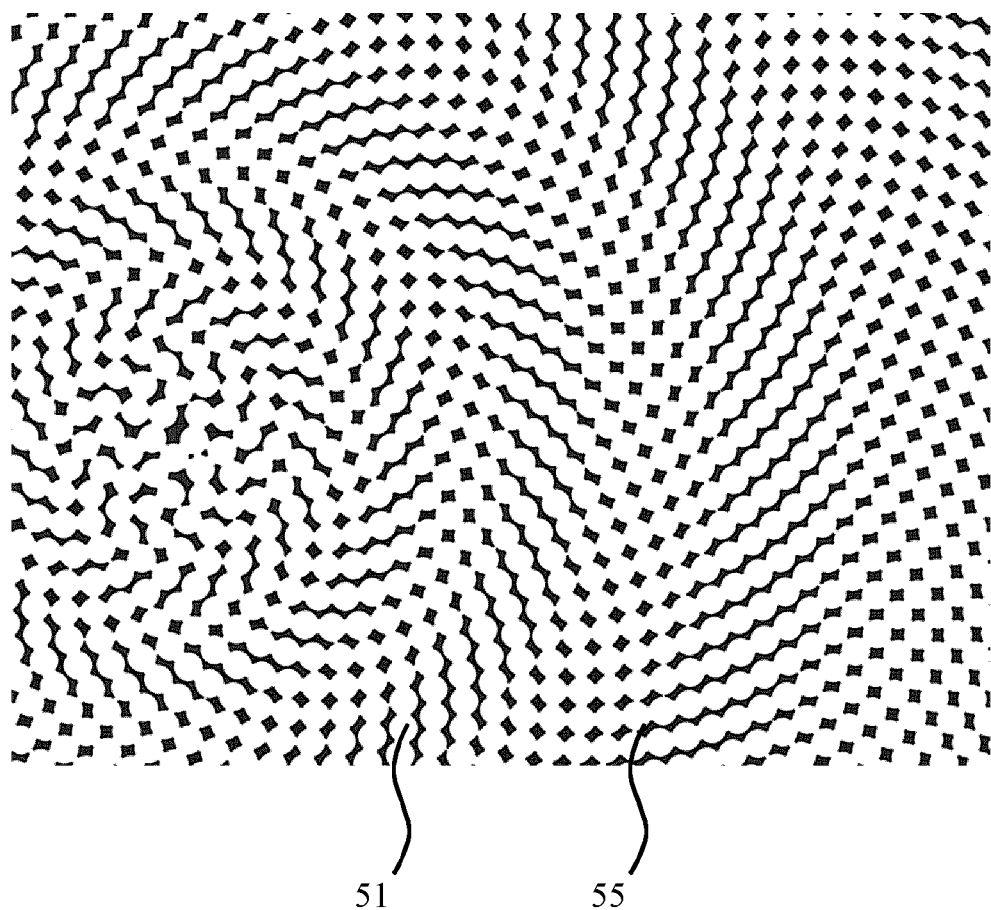
FIG. 4 schematically depicts a top view of an aspect of a lenslet arrangement according to an example embodiment.

FIG. 4 schematically depicts an example embodiment of the first lenslet array 50 having an irregular tessellation pattern in which the lenslets 51 are arranged in a phyllotaxis pattern in a relatively closed packing with wall shaped intersections 52 between adjacent lenslets 51 and with the light-transmissive planar facets 55 arranged at the pockets between the lenslets 51 as previously explained. It should be understood however that embodiments of the present invention are not limited to a specific type of irregular tessellation pattern and that alternative patterns such as irregular ring patterns, multi-crystal patterns and so on are equally feasible.

Figure 5:
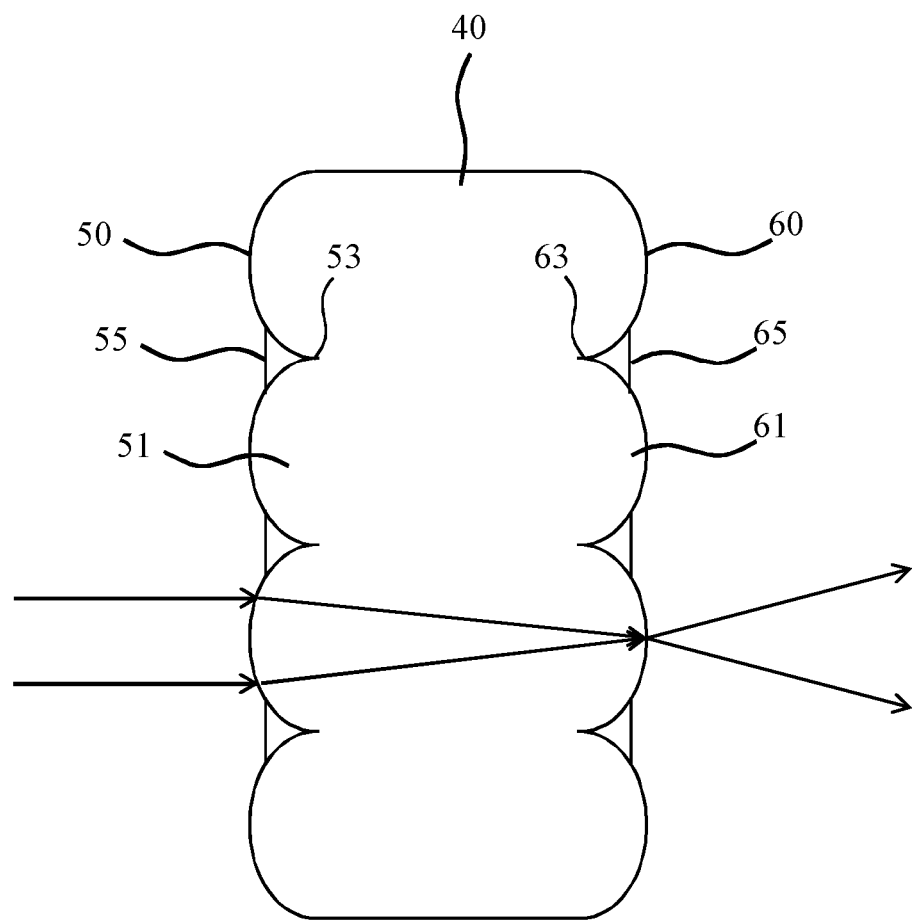
FIG. 5 schematically depicts a cross-sectional view of a lenslet arrangement according to another embodiment.

FIG. 5 schematically depicts a cross-sectional view of a lenslet arrangement 40 according to an alternative embodiment, in which pockets 63 between the further lenslets 61 of a second lenslet array 60 are covered by light-transmissive planar facets 65 in addition to such facets being present in the first lenslet array 50. Such further facets 65 do not significantly alter the aforementioned described optical performance of the lenslet arrangement 40; however, this yields a symmetrical lenslet arrangement 40 in that the first lenslet array 50 and the second lenslet array 60 are mirror images of each other, in contrast to the lenslet arrangement 40 of FIG. 1, which is asymmetric. A symmetric lenslet arrangement 40 has the advantage that the orientation of the arrangement relative to the light source to be imaged, i.e. which lenslet array faces the light source, does not affect the optical performance of the lenslets arrangement 40. This is in contrast with the asymmetric lenslet arrangement 40 of FIG. 1, in which the sharpness of the beam to be formed by the lenslet arrangement 40 may be controlled by which of the first lenslet array 50 and the second lenslet array 60 faces the light source to be imaged.

Figure 6:
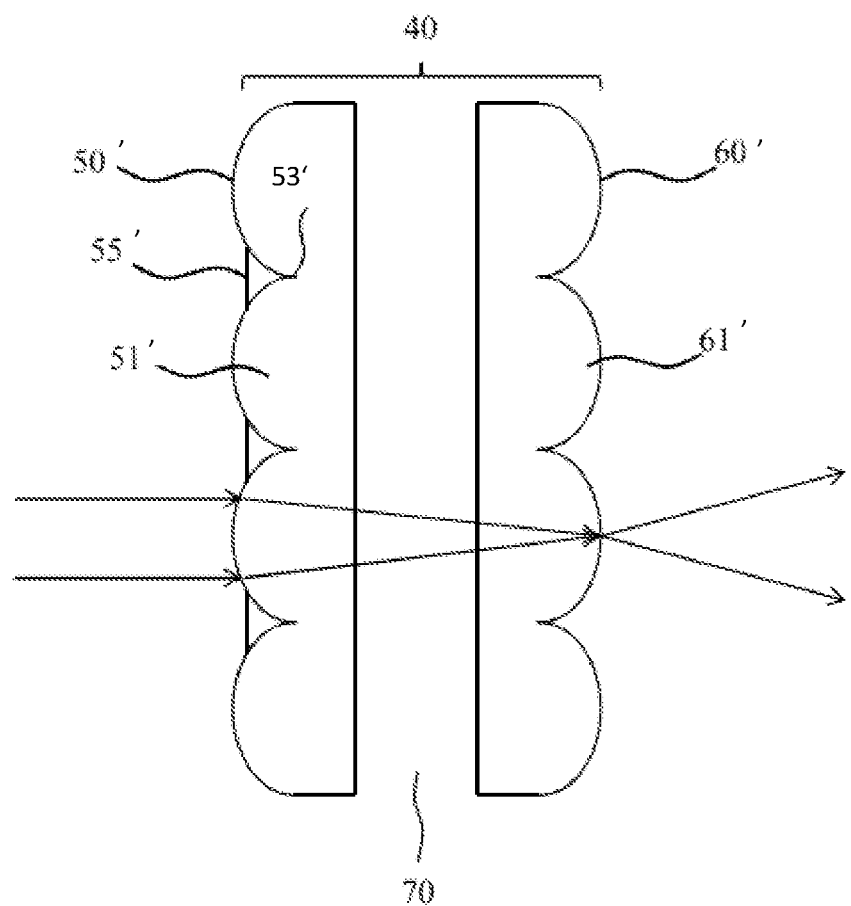
FIG. 6 schematically depicts a cross-sectional view of a lenslet arrangement according to yet another embodiment.

In the above embodiments, the lenslet arrangement 40 is formed as a single body, e.g. a lenslet plate, in which the first lenslet array 50' and the second lenslet array 60' are planar arrays. However, it should be understood that embodiments in which the first lenslet array 50' and the second lenslet array 60' are curved arrays may also be contemplated. In such a curved arrangement, the arrays 50' and 60' preferably have matching curvatures, e.g. to provide a curved single body of constant thickness in between the opposing lenslets 51', 61'. Moreover, the lenslet arrangement 40 is not necessarily provided as a single body. An alternative embodiment of the lenslet arrangement 40 is schematically depicted in the cross-sectional view of FIG. 6, in which the first lenslet array 50 and the second lenslet array 60' are discrete arrays on separate bodies separated by an air gap 70. As will be readily understood by the skilled person from the foregoing, although the lenslet arrangement 40 in FIG. 6 only contains planar facets 55' at the pockets 53' between the lenslets 51' of the first lenslet array 50', embodiments in which the second lenslet array 60' also comprises planar facets 65 at the pockets 63 between the further lenslet 61 are equally feasible.

Figure 7:
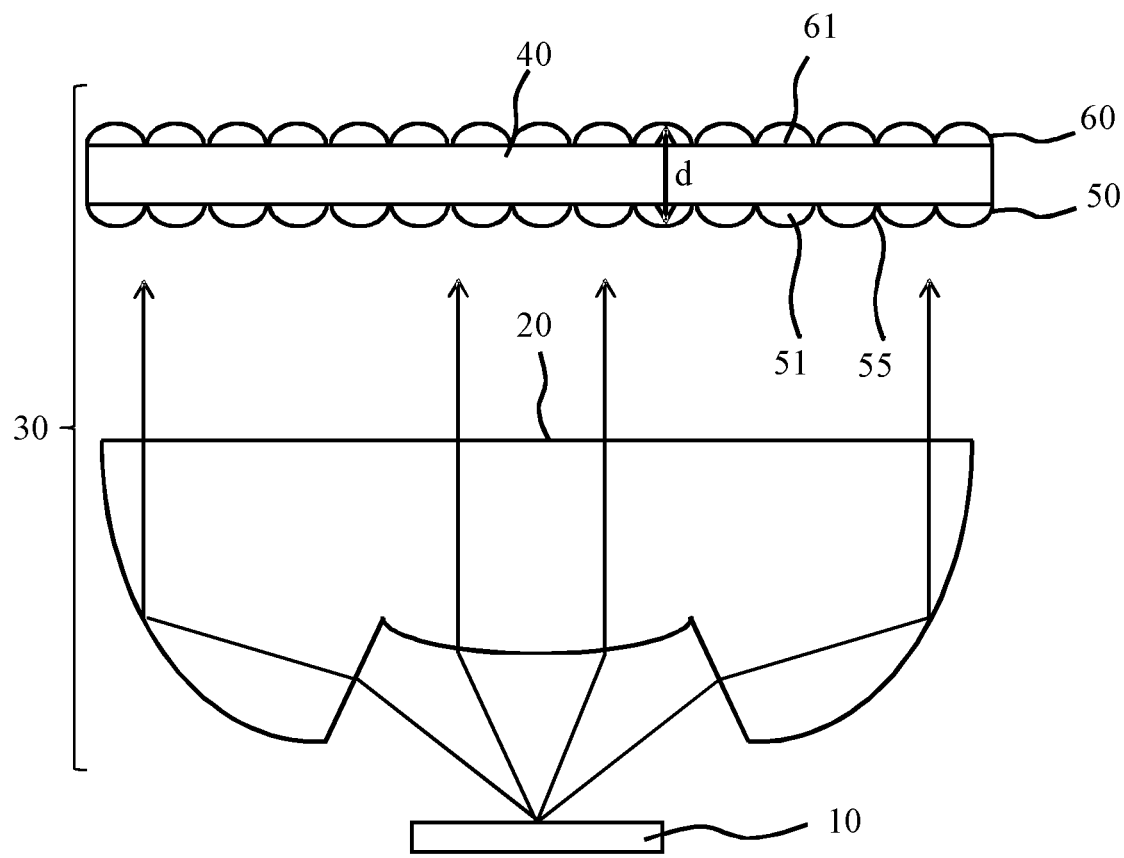
FIG. 7 schematically depicts a cross-sectional view of a lighting device according to an embodiment.

FIG. 7 schematically depicts a lighting device 1 according to an example embodiment. The lighting device 1 comprises an optical arrangement 30 according to an embodiment including, in addition to the lenslet arrangement 40, a collimator 20 arranged to generate a collimated light output. Such a collimator 20 may be any suitable type of collimator, such as for example a collimating TIR lens as shown in FIG. 7, a collimating reflector such as a parabolic reflector, and so on, to convert a divergent luminous output of one or more light sources 10 producing uncollimated light into a collimated luminous output. In case of multiple light sources 10, each light source 10 may be associated with a dedicated collimator 20, e.g. a collimating lens mounted over a light generating surface of the light source 10. In an embodiment, the lighting device 1 comprises one or more LEDs 10. Any suitable type of LED arrangement may be contemplated, e.g. white light LEDs, coloured LEDs, which may be arranged such that their respective luminous outputs are combined to form white light, and so on. Any suitable type of LED may be used for this purpose.

In a preferred embodiment, the lenslet arrangement 40 is positioned such that the first lenslet array 50 including the light-transmissive planar facets 55 over the pockets 53 between the lenslets 51 face the collimator 20. In this particular configuration, a particularly sharp beam, e.g. a round or circular beam, can be generated with a uniform halo surrounding the main beam profile as previously explained. However, in an alternative embodiment, in case of an asymmetric lenslet arrangement 40, the second lenslet array 60 may be facing the collimator 20, in which case a more diffuse beam profile is created.

Figure 8:
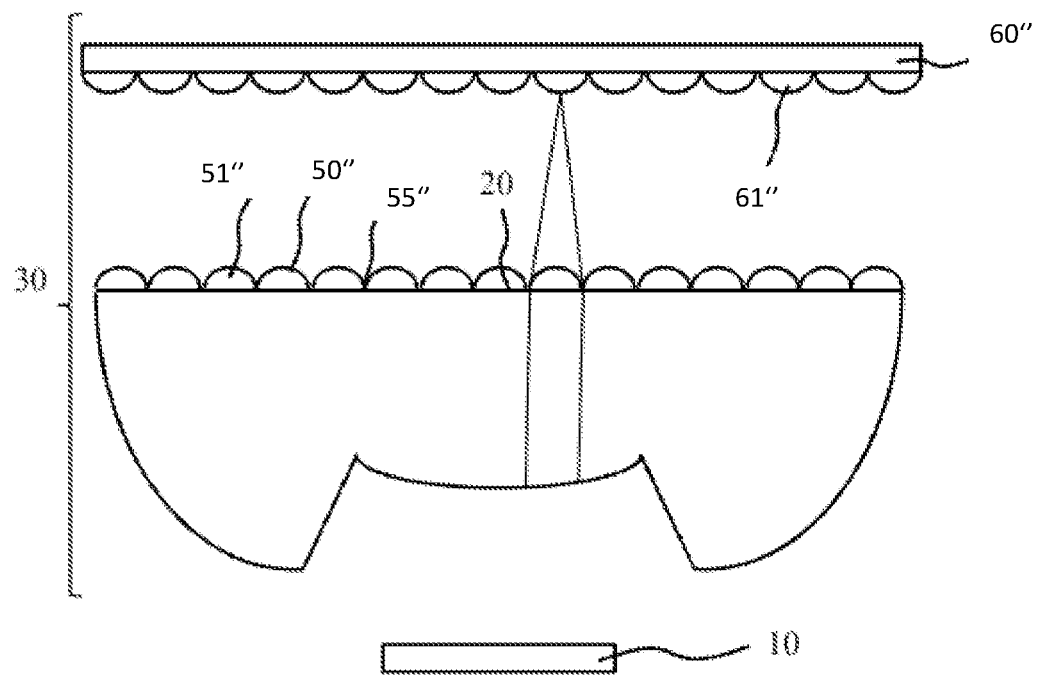
FIG. 8 schematically depicts a cross-sectional view of a lighting device according to another embodiment.

In the optical arrangement 30, the lenslet arrangement 40 may be discrete from the collimator 20. However, in alternative embodiments, at least part of the lenslet arrangement 40, e.g. the first lenslet array 50" and/or the second lenslet array 60", may form an integral part of the collimator 20 as schematically depicted in FIG. 8.

The lighting device 1 in some embodiments may be a spot light of any suitable type. Non-limiting examples of such spots include MR16, GU10, PAR, AR111 bulbs, and professional spot lights and so on. Generally speaking, the lighting device 1 may be any type of lighting device, e.g. any type of spot light, generating a beam angle with a full width at half maximum (FWHM) of about 40° or less. Such a lighting device 1 may form part of a luminaire such as a spotlight, down lighter or any other suitable type of luminaire. Such a luminaire may form part of an electronic device including illumination functionality, such as for example an extractor fan, cooker hood or the like.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An integrating lenslet arrangement including:
a first array having a plurality of first lenslets arranged in an irregular pattern, a shared wall shaped intersection between some of adjacent first lenslets, pockets defined between some of adjacent first lenslets, and a plurality of transmissive first planar facets covering some of the pockets; and
a second array having a plurality of second lenslets arranged in the same irregular pattern as the first array and forming a second array positioned downstream from the first array, each second lenslet being aligned with a corresponding one of said first lenslets.

2. The integrating lenslet arrangement of claim 1, wherein the planar facets lie in a single virtual plane.

3. The integrating lenslet arrangement of claim 1, wherein the first array and the second array are provided on opposing surfaces of a single body.

4. The integrating lenslet arrangement of claim 1, wherein the first array and the second array are provided on spatially separated bodies.

5. The integrating lenslet arrangement of claim 1, wherein the planar facets covers less than 20% of a total surface of the first array.

6. The integrating lenslet arrangement of claim 1, wherein the shared wall shaped intersection extend in a direction transverse to the planar facets of the first array.

7. The integrating lenslet arrangement of claim 1, the second lenslet array further comprising a plurality of transmissive second planar facets in between the lenslets.

8. The integrating lenslet arrangement of claim 1, wherein the second array has no transmissive planar facets.

9. The integrating lenslet arrangement of claim 1, wherein only 30% to 90% of pockets between the lenslets is covered by the planar facets.

10. The integrating lenslet arrangement of claim 1, wherein the lenslets of both the first and second arrays have locally varying sizes.

11. The optical arrangement of claim 10, wherein the first lenslet array is integral to the collimator.

12. An optical arrangement comprising a collimator and the integrating lenslet arrangement of claim 1.

13. A lighting device comprising the optical arrangement of claim 12, and at least one LED light source positioned relative to the collimator such that the collimator collimates the light of the at least one LED light source and projects said collimated light onto the lenslet arrangement.

14. The lighting device of claim 13, wherein the lighting device is a light bulb.

15. A luminaire comprising:
 a housing; and
 the lighting device of claim 14.

\* \* \* \* \*